United States Patent
Raghava et al.

Patent Number: 5,255,735
Date of Patent: Oct. 26, 1993

[54] FUEL VAPOR RECOVERY DEVICE

[75] Inventors: Ram S. Raghava, Ann Arbor; Philip A. Langran, Northville; Richard H. Wykoff, Livonia, all of Mich.

[73] Assignee: Ford Motor Company, Dearborn, Mich.

[21] Appl. No.: 994,154

[22] Filed: Dec. 21, 1992

[51] Int. Cl.$^5$ .............................. F28B 9/10; F28B 9/08
[52] U.S. Cl. ........................................ 165/111; 62/3.4; 62/3.7; 62/47.1; 95/17; 95/288; 55/267
[58] Field of Search ................ 165/111; 62/47.1, 48.2, 62/3.4, 3.7; 55/80, 88, 89, 269; 123/541

[56] References Cited

U.S. PATENT DOCUMENTS

| | | | |
|---|---|---|---|
| 2,682,752 | 7/1954 | Branson | 62/48.2 |
| 3,040,538 | 6/1972 | Alsing | 62/3.2 |
| 3,367,120 | 2/1968 | Franklin | 62/3.4 |
| 3,586,015 | 6/1971 | Kitzner . | |
| 3,734,293 | 5/1973 | Biskis . | |
| 3,791,422 | 2/1974 | Johnson et al. | 62/47.1 |
| 3,831,353 | 8/1974 | Toth . | |
| 4,453,503 | 6/1984 | Freeburn . | |
| 4,671,071 | 6/1987 | Sasaki | 62/47.1 |
| 4,732,588 | 3/1988 | Covert . | |

*Primary Examiner*—Albert W. Davis, Jr.
*Attorney, Agent, or Firm*—Damian Porcari; Roger L. May

[57] ABSTRACT

A fuel vapor recovery device having: a condenser in communication with fuel vapor from a fuel tank, the condenser condenses fuel from the fuel vapor; a reservoir collecting condensate from the condenser, the reservoir maintains the condensate at a temperature sufficient to maintain the condensate in a liquid state; and return means returning the condensate to the fuel tank. Also disclosed is a method of removing fuel from a fuel vapor including the steps of: passing the fuel vapor from a fuel tank through a condenser; condensing the fuel from the vapor; cooling the condensate to a temperature sufficient to maintain the condensate in a liquid state; and returning the condensate to a fuel tank periodically.

7 Claims, 2 Drawing Sheets

FUEL VAPOR RECOVERY DEVICE

FIELD OF THE INVENTION

This invention relates generally to controlling the amount of fuel vapor emitted from a fuel system. More specifically, the present invention relates to condensing fuel from a fuel vapor mixture and returning the condensate to the fuel tank.

BACKGROUND OF THE INVENTION

Modern automotive fuel tanks are designed to hold a quantity of fuel and maintain a volume of vapor above the fuel. Because fuels are highly volatile, a portion of the fuel vaporizes and forms a fuel vapor mixture in the fuel tank. During refueling, this fuel vapor mixture must be displaced by fuel. To prevent the unwanted release of the fuel vapor into the atmosphere, various means exist to remove the fuel from the vapor. Typical of these systems is an adsorbent taught in U.S. Pat. No. 3,831,353 where a fuel tank is connected to a canister containing an adsorbent such as activated carbon. Fuel in the fuel vapor passes through the canister and is trapped by the adsorbent. The adsorbent is purged by drawing air from the air induction system of the engine. Carbon canisters of this type require a relatively large volume of space to trap fuel vapor and connection lines between the fuel tank, canister and engine. The bulk and complexity of conventional canister systems as well as the possibility of permeation makes an in-tank vapor recovery system desirable.

Thermal electric coolers have been used to alternatively heat and cool absorbers, fuels and fuel vapors. To date, they have not provided an efficient, compact design specifically directed to reducing the quantity of fuel vapor above a liquid.

SUMMARY OF THE INVENTION

The present invention provides a fuel vapor recovery device comprising: a condenser in communication with fuel vapor from a fuel tank, the condenser condenses fuel from the fuel vapor; a reservoir collecting condensate from the condenser, the reservoir maintains the condensate at a temperature sufficient to maintain the condensate in a liquid state; and return means returning the condensate to the fuel tank. The invention also includes a method of removing fuel from a fuel vapor comprising the steps of passing the fuel vapor from a fuel tank through a condenser; condensing the fuel from the vapor; cooling the condensate to a temperature sufficient to maintain the condensate in a liquid state; and returning the condensate to a fuel tank periodically.

The invention provides a compact device for removing fuel from the vapor above the fuel liquid. The fuel vapor is passed through a foraminous condenser. The condensate is made up of the most highly volatile constituent components of the fuel. If the condensate were returned to a hot fuel tank, it would quickly re-vaporize. Therefore, the condensate is maintained in a cooled state until the reservoir is full or until the fuel tank is at temperature low enough for the condensate to remain liquid.

The invention reduces or eliminates the need for carbon canisters and associated connecting lines between the canister, fuel tank and engine intake manifold Eliminating the canister and corresponding connecting lines simplifies assembly and reduces the possibility of permeation through these components.

DETAILED DESCRIPTION OF THE PREFERRED EMBODIMENTS

Figure 1:
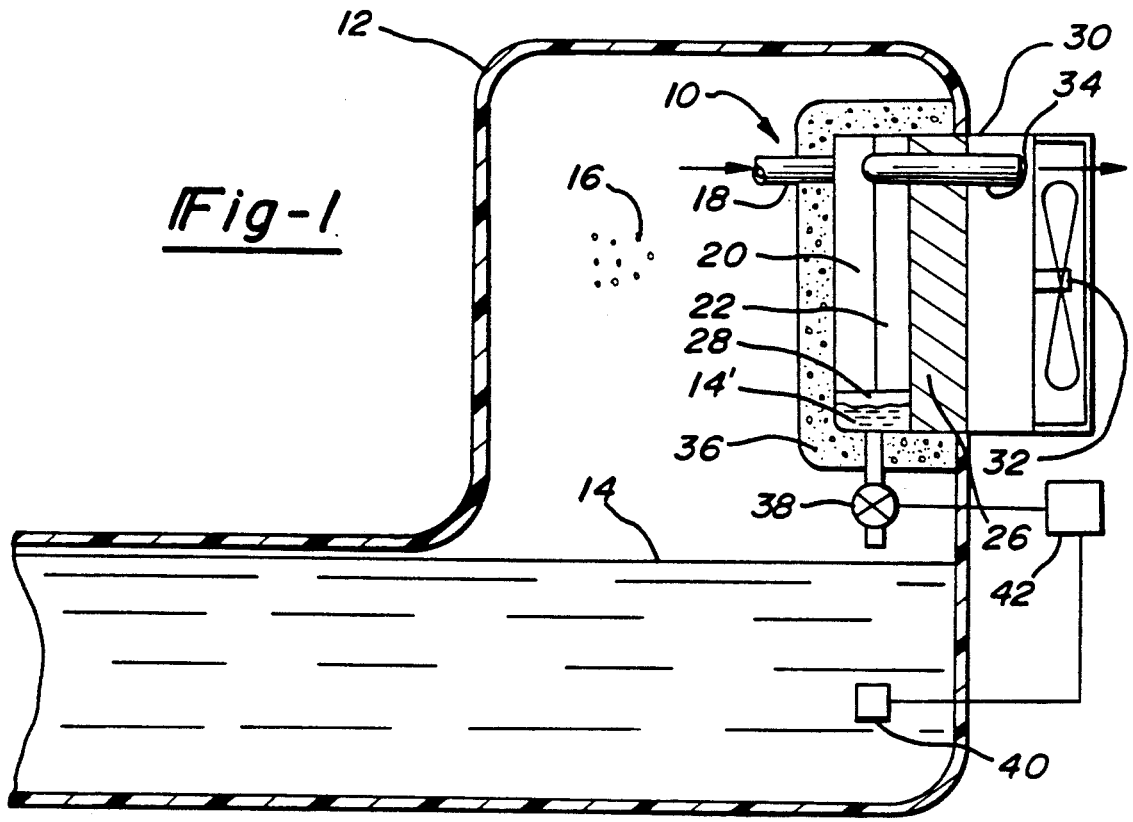
FIG. 1 is a partial cross-sectional view of a fuel vapor recovery device in a fuel tank.

The present invention relates to an in-tank fuel vapor recovery device. In certain circumstances where the fuel tank does not contain sufficient space to accommodate such a device, outboard devices are possible which are connected to a fuel tank through conduits. Illustrated in FIG. 1 is a partial cross-sectional view of fuel vapor recovery device 10 installed within fuel tank 12. Device 10 is preferably located in the ullage space above liquid fuel 14. Device 10 receives fuel vapor 16 through inlet 18. Device 10 operates in response to a 24 hour thermal cycle commonly referred to as a diurnal cycle. The diurnal cycle represents the continuously changing ambient temperature in the immediate environment within fuel tank 12. Fuel vapor 16 expands as the temperature within fuel tank 12 rises. Because the volume of fuel tank 12 is relatively constant, fuel vapor 16 is forced into inlet 18 and through device 10. The flow rate of fuel vapor 16 through inlet 18 changes as a function of the change in temperature of fuel tank 12. For conventional automotive fuel tanks, flow rates of approximately 15 to 100 cubic centimeters per minute can be achieved in normal operating conditions.

Figure 2:
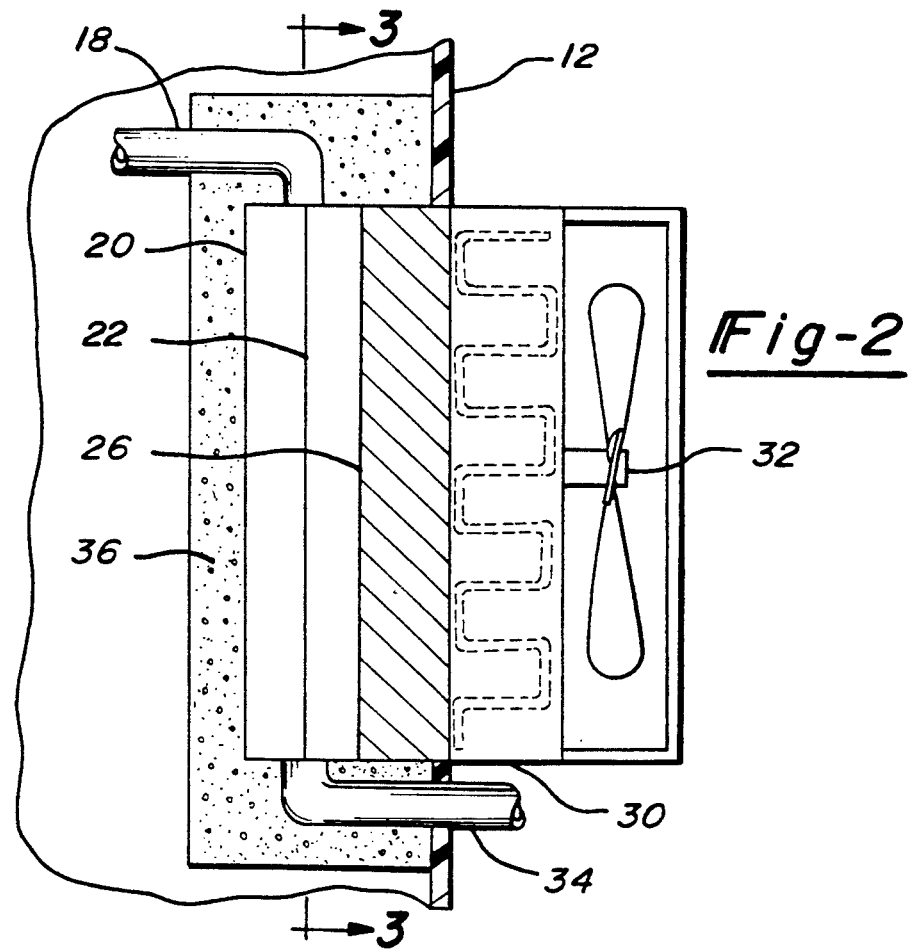
FIG. 2 is a plan view partially broken away of the device shown in FIG. 1.
Figure 3:
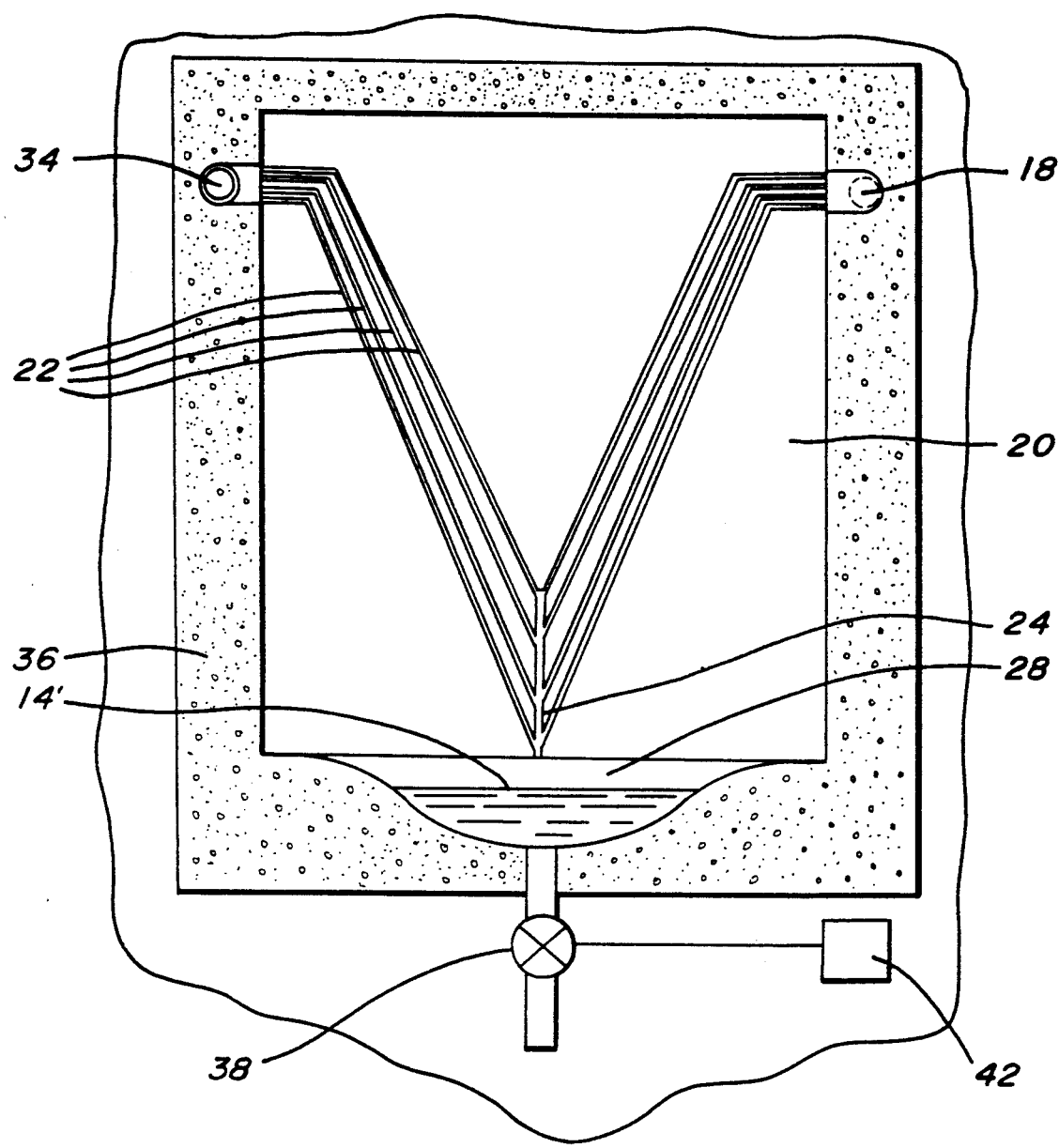
FIG. 3 is cross-sectional view taken along the line 3—3 in FIG. 2.

Fuel vapors 16 pass through inlet 18 and into condenser 20. Condenser 20 may include a variety of heat exchanging designs. Illustrated in FIGS. 2 and 3 is a condensor having a series of chemically etched passages 22 each roughly one millimeter in diameter. Condensor 20 has a relatively high surface area to flow rate ratio and is very effective at condensing fuel vapors. One example of a suitable condensor is manufactured by Exergy Inc. of Hansor, Mass.

Fuel vapor 16 passes through passages 22 and is condensed on the wall surface of passages 22. Liquid fuel condensate 14' is collected by passage 24. Passages 22 are sized to optimally condense fuel vapor 16 at temperatures between 0° and −20° C. and at a pressure of less than 1.0 psi.

Condensor 20 is attached to cooler 26. Cooler 26 may include a wide variety of devices available in the art. Particularly preferred is a thermal electric cooler operating on a DC electric voltage using the peltier effect. Cooler 26 cools condensor 20 causing fuel within fuel vapor 16 to condense on the surface of passages 22. Condensate 14' drips down passage 24 and is collected in reservoir 28. Heat exchanger 30 is attached to cooler 26 and draws heat from condensor 20. Heat exchanger 30 is preferably in communication with the atmosphere. To increase the efficiency of heat exchanger 30, fan 32 may be used to increase the air flow about heat exchanger 30.

Air enters device 10 through the diurnal increase of pressure within tank 12. After the fuel is removed from the vapor, the air vapor may be vented to atmosphere through outlet 34 to equalize the pressure within tank 12. Insulation 36 surrounds device 10 to increase the condensation efficiency and lower overall power requirements.

Gasoline comprises a wide variety of constituent components. The most volatile of these components are the first to vaporize. To maintain condensate 14' in a liquid state, it must remain cool. Reservoir 28 is attached directly to cooler 26 so as to maintain condensate 14' at a temperature cool enough to remain liquid. Condensate 14' is maintained within reservoir 28 until reservoir 28 is full or until the fuel tank temperature is cool enough to prevent the condensate from re-vaporizing.

Valve 38 is attached to reservoir 28. Valve 38 may be an overflow device to drain reservoir 28 when condensate 14' reaches a certain level, but preferred is an electrical valve which operates between an opened and closed position to periodically drain condensate 14' within reservoir 28. Optionally, temperature probe 40 monitors the temperature within fuel tank 12 and sends an electrical signal to controller 42. Controller 42 may operate as a timer or may use the signal from probe 40 to determine if the temperature within fuel tank 12 is cool enough to maintain the condensate in a liquid state. Controller 42 signals valve 38 to open thereby draining reservoir 28 into fuel tank 12.

The invention is intended to operate on a diurnal cycle whereby the fuel and fuel vapor temperature within fuel tank 12 begins at a first low temperature and increases to a second higher temperature. Several conditions exist for this increase in temperature. The first being the normal daily variation in temperature between night and day, the second being a common characteristic of modern fuel injected engines whereby excess fuel is provided to the engine and returned to the fuel tank. The fuel picks up heat from the engine and returns it to the fuel tank thereby increasing the fuel temperature. An increased temperature within fuel tank 12 causes an increased pressure in fuel vapor 16. Fuel vapor 16 enters device 10 through inlet 18. Fuel is condensed from fuel vapor 16 in condensor 20 and drips down into reservoir 28. Reservoir 28 keeps condensate 14' cool enough to maintain it in a liquid state until it is returned to fuel tank 12. Condensate 14' generally remains within reservoir 28 while the vehicle is in use.

Because a low voltage thermal electric cooler 26 is used in device 10, it is anticipated that device 10 would operate continuously. If the vehicle were not used for an extended period of time, device 10 could be suspended so as to prevent unwanted battery drain.

Controller 42 signals valve 38 to open and return condensate 14' to fuel tank 12. This preferably occurs when fuel tank 12 is at a low temperature, usually at night. Controller 42 may optionally measure the temperature signal from probe 40 to determine this low temperature.

The invention has been described as an in-tank fuel vapor condensor using a thermo-electric cooler. Other applications and devices are also within the scope of the invention and the appended claims.

We claim:

1. A fuel vapor recovery device comprising:
   a condenser in communication with fuel vapor from a fuel tank, said condenser condensing fuel from said fuel vapor;
   a reservoir collecting condensate from said condenser, said reservoir maintaining said condensate at a temperature sufficient to maintain said condensate liquid;
   return means returning said condensate to said fuel tank;
   a valve between said reservoir and said return means; and
   a control means controlling the operation of said valve, said control means opening said valve and returning said condensate when the temperature of said fuel is sufficient to maintain said condensate liquid.

2. A fuel vapor recovery device comprising:
   a condenser having one or more passages, said passages having a diameter of about 1 millimeter and said condenser being in communication with fuel vapor from a fuel tank and condensing fuel from said fuel vapor;
   a reservoir collecting condensate from said condensor, said reservoir maintaining said condensate at temperature sufficient to maintain said condensate liquid; and
   return means returning said condensate to said fuel tank.

3. The device of claim 2, further comprising a vent communicating between said condenser and atmosphere, said vent receiving vapor which has had substantially all of said fuel condensed therefrom.

4. The device of claim 2, wherein said condenser communicates with a thermoelectric cooler.

5. A method of removing fuel from a fuel vapor comprising the steps of:
   passing said fuel vapor from a fuel tank through a condenser;
   condensing said fuel from said vapor;
   cooling said condensate to a temperature sufficient to maintain said condensate liquid; and
   measuring the temperature of said fuel tank and opening a valve to return said condensate to said fuel tank when the temperature of said fuel tank is sufficient to maintain said condensate liquid.

6. The method of claim 5, further comprising the step of venting said vapor to atmosphere, after said vapor has had substantially all of said fuel condensed therefrom.

7. A method of removing fuel from a fuel vapor comprising the steps of:
   passing said fuel vapor from a fuel tank through a condenser having one or more passages, said passages having a diameter of about 1 millimeter;
   condensing said fuel from said vapor;
   cooling said condensate to a temperature sufficient to maintain said condensate liquid; and
   returning said condensate to said fuel tank periodically.

* * * * *